G. H. DAY.
BRIDGE.
APPLICATION FILED DEC. 26, 1917.
1,307,118.
Patented June 17, 1919.
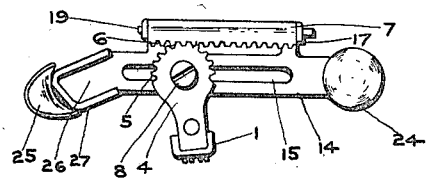
FIG. I
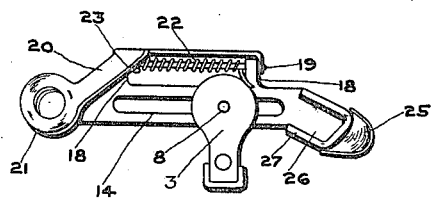
FIG. II
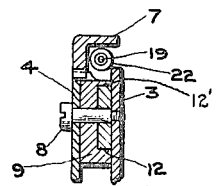
FIG. III
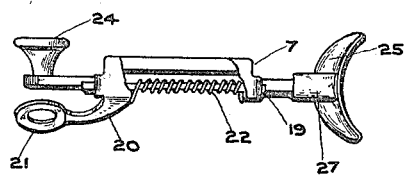
FIG. IV
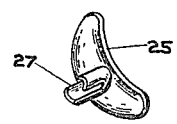
FIG. VI
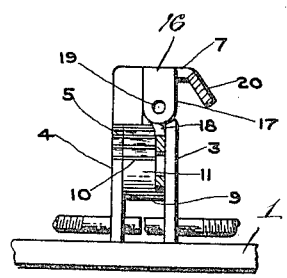
FIG. V
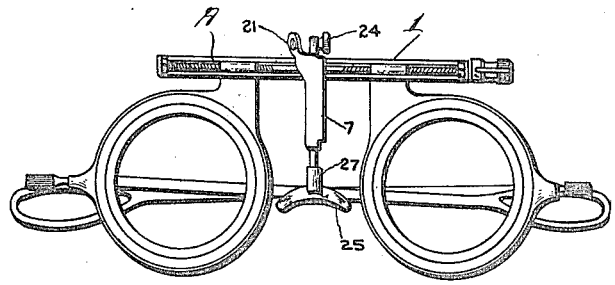
FIG. VII
INVENTOR
GEORGE H. DAY
BY
H. H. Styll, A. H. Parsons
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

BRIDGE.

1,307,118.  Specification of Letters Patent.  Patented June 17, 1919.

Application filed December 26, 1917.  Serial No. 208,935.

*To all whom it may concern:*

Be it known that I, GEORGE H. DAY, a citizen of the United States, residing at Southbridge, in the county of Worcester and State of Massachusetts, have invented certain new and useful Improvements in Bridges, of which the following is a specification.

This invention relates to new and useful improvements in eye testing instruments and more particularly to an adjustable bridge member for attachment to a trial frame, the main object of the present invention being the provision of an adjustable nose bridge adapted to be applied to a trial frame for determining the position of the frame with respect to the face during the testing of the vision of a patient.

Another object of the present invention is the provision of a nose bridge which can be quickly and readily applied to any well known make of trial frame and is mounted for swinging movement and also longitudinal adjustment, whereby the position of the nose bridge with respect to the frame can be quickly and readily varied as desired.

A further object of this invention is the provision of an adjustable nose bridge having means for securely holding the bridge after once being placed in an adjusted position, but by which at the same time it can be quickly and readily released to permit of further adjustment.

Still further object of this invention is the provision of an adjustable device as set forth above, wherein the nose rest is detachably connected with the body portion of the bridge so that various sizes and forms of nose rests may be used when desired.

With the above and other objects in view, the invention consists in the novel features of construction and the combination and arrangement of parts hereinafter more fully set forth, pointed out in the claims and shown in the accompanying drawings, in which—

Figure I is a side elevation of an adjustable nose bridge constructed in accordance with my invention.

Fig. II is a similar view looking at the opposite side from that shown in Fig. I.

Fig. III is a transverse sectional view.

Fig. IV is a top plan view, parts thereof being broken away.

Fig. V is an end elevation, parts thereof being broken away and illustrated in cross section.

Fig. VI is a detail perspective view of the detachable nose rest, and

Fig. VII is a front elevation of a trial frame illustrating my improved nose rest as applied thereto.

In illustrating and describing the present invention it will be noted that my improved nose bridge is applied to a trial frame, but it will be understood that the device can be used equally as well upon any support adapted for the purpose.

In the drawings accompanying this application, the letter A indicates the body portion of a trial frame which includes in its construction a channel bar 1, which is U shaped in cross section and mounted therein is the frame adjusting rod 2. Supported upon the adjusting rod and having their reduced inner ends disposed within the channel bar 1 are a pair of spaced plates 3 and 4, the outer ends of which are substantially arcuate in form, as clearly illustrated in Figs. I and II, and the plate 4 is preferably provided with a plurality of teeth 5 adapted to mesh with the teeth 6 on a longitudinal movable bar 7.

Arranged between the plates 3 and 4 and mounted for rotation upon the pivot pin 8 is a gear 9, half of which is provided with a plurality of teeth 10 adapted to correspond with the teeth 5 on the plate 4, and also to mesh with the teeth 6 on the bar 7, whereby when the teeth 6 are meshed with both sets of teeth 5 and 10 the bridge member is securely held in adjusted position. This gear 9 is provided with a smooth portion 11 and further provided upon one side thereof with a cutaway portion forming a supporting shoulder 12 and a retaining flange 12′. Mounted for sliding movement within this cut-away portion is a plate 14, having a slot 15 adapted to receive the pin 8, which serves as a bearing for the plate 14 and also as a support for the gear 9. It will be noted that the shoulder 12 and the flange 12′ will securely hold the plate 14 against any lateral movement with respect to the gear.

The bar 7 is provided with a reduced portion 16 at one edge thereof and arranged at each end of the reduced portion is an apertured ear 17 adapted to be disposed in alinement with the bearing lugs 18 which extend outwardly from one edge of the plate 14 to receive the ends of the pivot rod 19 which supports the bar 7 in its operative position.

In order to actuate the bar 7 upon its pivot an arm 20 extends in a substantially parallel plane from one end of the bar and is provided with a fingerpiece 21 which is adapted to be pressed inwardly toward one end of the plate 14 to tilt the bar 7 upon its pivot and disengage the teeth 6 from the teeth 5 and 10, whereby the entire device may be either swung upon the pivot 8 or moved longitudinally between the two plates 3 and 4. The teeth 6 of the bar 7 are normally held in engagement with the teeth 5 and 10 by means of a coil spring 22 mounted upon the pivot rod 19 and having one end bearing against the plate 14 while the other end of the spring has engagement with the bar 7, as shown at 23, to retain the spring under tension so that the bar will be securely retained in its normal position.

Attached to one end of the plate 7 is a fingerpiece 24 arranged in opposed relation with the fingerpiece 21 whereby the thumb and fore finger can be readily engaged with these two fingerpieces to actuate the bar 7 and move or swing the nose bridge in various adjusted positions. From this it will be readily apparent that by grasping the two fingerpieces 21 and 24 with the thumb and forefinger and pressing inwardly upon the fingerpiece 21 the teeth 6 will be disengaged from the teeth 5 and 10 to readily permit of the swinging movement or longitudinal adjustment of the device with respect to the bearing or pivot 8. It will be noted that in releasing or disengaging the teeth it will place the spring 22 under tension and as soon as the fingerpiece 21 is released the tension of this spring will return the bar 7 to its normal position and engage the teeth 6 with the teeth 5 and 10 so that the device will be securely retained in any adjusted position.

It will be noted that the gear 9 is connected with the bar 14 so that the same moves simultaneously and when it is desired to retain the nose bridge in any desired position the teeth on the bar 7 will be engaged with the teeth on both the gear and the plate 4, thus providing a substantially wide engaging surface for the teeth 6.

In connection with my improved adjustable nose bridge I provide a detachable rest, the main body portion 25 being arcuately curved longitudinally and of a width whereby the same will readily accommodate itself to nose bridges of various sizes.

In order to detachably connect this rest to the outwardly projecting arm 26 of the bar 14 I provide a U shaped member which is channel form in cross section and the intermediate portion thereof is rigidly secured in any desirable manner to the central portion of the rest 25.

It will be understood that this U shaped member 27 may be integrally formed with the rest 25 or soldered or otherwise secured thereto. The ends of the U shaped member 27 are of channel form whereby to receive the longitudinal edges of the arm 26 and are preferably of a yielding or spring material so that they will be at all times held in clamping engagement with the edges of the arm 26.

From the above description it will be apparent that I have provided a detachable nose rest whereby various sizes and shapes of rests can be readily attached to or removed from the arm 26 and at the same time when applied to the arm will be retained in their respective positions.

I claim:

1. An adjustable crown, including spaced supporting plates, a movable member supported between the plates for longitudinal swinging movement, a bridge crown carried by the movable member, a plurality of teeth formed on the outer end of one of the supporting plates, and a plurality of teeth carried by the movable member for engagement with the teeth on the plate to retain the movable member in an adjusted position.

2. A device of the class described, including a pair of spaced supporting plates, a pin connecting said plates, a gear member disposed between the plates and mounted for rotation upon the pin, said gear having an offset provided with guide shoulders upon opposite sides thereof, a movable plate disposed between the guide shoulders and having a slot in which the pin is disposed, said plate being adapted for longitudinal and swinging movement, and co-engaging means carried by the plate and one of the supporting plates for retaining the movable plate in various adjusted positions.

3. A device of the class described, including spaced supporting plates, a pin connecting said plates, a gear member mounted upon the pin and movably disposed between the plates, a movable member supported between the plates and having engagement with the gear for simultaneous rotative movement therewith and co-engaging means carried by the movable plate and one of the supporting plates for retaining the movable plate in various adjusted positions.

4. A device of the class described, including spaced supporting plates, a movable plate disposed between the supporting plates and mounted for swinging and sliding movement, a retaining bar carried by the movable plate, co-engaging teeth carried by the bar and one of the supporting plates for retaining the movable member in an adjusted position, and means for normally retaining the teeth on the bar in engagement with the teeth on the supporting plate.

5. A device of the class described, including spaced supporting plates, a movable bar mounted between said plates and adapted for sliding and swinging movement, a retaining bar pivotally mounted upon the movable member, co-engaging teeth carried by the bar and one of the supporting plates for retaining the movable member in an adjustable position, a coil spring having engagement with the bar and movable member to normally retain the teeth on the bar in engagement with the teeth on one of the supporting plates, and manually operated means carried by the bar for actuating the same and disengaging the teeth to permit adjustment of the movable member.

6. A device of the class described including supporting plates, a movable member supported by said plates for longitudinal and swinging movement, stationary and movable pinions carried by the plates, and means carried by the movable member for locking said pinions together and thus to retain the movable member in various adjusted positions.

7. A device of the class described including supporting plates, movable members supported by said plates for longitudinal and swinging movement, stationary and movable pinions carried by the plates, a spring actuated rack bar carried by the movable member for engagement with the pinions to lock them together and thus to retain the movable member in various adjusted positions 8. A device of the class described including a movable and stationary pinion, a movable member mounted upon the pivot of said pinions, and means carried by the movable member for engagement with the pinions to lock them together and to retain the movable member in various adjusted positions.

9. A device of the class described including a stationary and movable pinion, a movable member mounted adjacent the pinions, and means carried by the movable member for engagement with the pinions to lock them together and to retain the movable member in various adjusted positions.

10. A device of the class described including a stationary and movable pinion, a movable member mounted adjacent the pinions, and a spring actuated rack bar carried by the movable member for engagement with the pinions to lock the movable member as and for the purpose set forth.

In testimony whereof I have affixed my signature, in presence of two witnesses.

GEORGE H. DAY.

Witnesses:
Wm. P. Chase,
William B. Jones.